United States Patent [19]

Fuentes, Jr. et al.

[11] Patent Number: 4,661,465
[45] Date of Patent: Apr. 28, 1987

[54] METHOD FOR PREPARING TRANSITION METAL COMPONENT OF ZIEGLER-NATTA CATALYSTS

[75] Inventors: Ricardo Fuentes, Jr.; Gary R. Marchand; Larry A. Meiske, all of Baton Rouge, La.

[73] Assignee: The Dow Chemical Company, Midland, Mich.

[21] Appl. No.: 894,406

[22] Filed: Aug. 7, 1986

Related U.S. Application Data

[63] Continuation-in-part of Ser. No. 794,219, Oct. 31, 1985, abandoned.

[51] Int. Cl.$^4$ .................. C08F 4/62; C08F 4/64; C08F 4/68
[52] U.S. Cl. .................. 502/111; 502/115; 502/125; 526/125; 526/142
[58] Field of Search .................. 502/111, 115, 125

[56] References Cited

U.S. PATENT DOCUMENTS

| | | | |
|---|---|---|---|
| 3,644,318 | 2/1972 | Diedrich et al. | 260/88.2 |
| 3,901,863 | 8/1975 | Berger et al. | 260/88.2 |
| 3,917,575 | 11/1975 | Matsuura et al. | 260/88.2 R |
| 3,951,935 | 4/1976 | Engelmann | 526/129 |
| 4,006,101 | 2/1977 | Matsuura et al. | 252/429 C |
| 4,039,472 | 8/1977 | Hoff | 252/429 C |
| 4,083,802 | 4/1978 | Matsuura et al. | 252/429 C |
| 4,085,276 | 4/1978 | Toyota et al. | 526/122 |
| 4,105,846 | 8/1978 | Hoff et al. | 526/124 |
| 4,115,319 | 8/1978 | Scata et al. | 252/429 B |
| 4,187,385 | 2/1980 | Iwao et al. | 526/128 |

FOREIGN PATENT DOCUMENTS

| | | |
|---|---|---|
| 0000007 | 12/1978 | European Pat. Off. |
| 2758312 | 7/1978 | Fed. Rep. of Germany |
| 51-111281 | 10/1976 | Japan |
| 51-148785 | 12/1976 | Japan |
| 762246 | 3/1977 | South Africa |
| 1235062 | 6/1971 | United Kingdom |
| 1275641 | 5/1972 | United Kingdom |
| 1306001 | 2/1973 | United Kingdom |
| 1309987 | 3/1973 | United Kingdom |
| 1311013 | 3/1973 | United Kingdom |
| 1502567 | 3/1978 | United Kingdom |
| 1538472 | 1/1979 | United Kingdom |
| 1539175 | 1/1979 | United Kingdom |

OTHER PUBLICATIONS

Derwent Abstract of Japanese J56104908.
Derwent Abstract of Japanese J56141304.
Derwent Abstract of Japanese J56166206

*Primary Examiner*—Patrick P. Garvin
*Attorney, Agent, or Firm*—James G. Carter

[57] ABSTRACT

A method for preparing Ziegler catalysts is disclosed wherein a mixture (A) containing the product resulting from mixing in an inert hydrocarbon diluent (1) a hydrocarbon soluble magnesium alkyl compound in said hydrocarbon solvent, (2) an aliphatic alcohol or carbon dioxide and (3) a titanium compound is reacted with (B) a reducing halide source in said hydrocarbon solvent. Components (A) and (B) are mixed at a constant initial temperature. When the magnesium concentration in component (A) and the metal concentration in component (B) are relatively low, the resultant polymer has a relatively narrow particle size distribution whereas when said concentration is relatively high, the resultant polymer has a relatively broad particle size distribution. When the ratio of the number of moles of aliphatic alcohol:total number of hydrocarbyl groups attached to the metal atom in component (1) is relatively low, the resultant polymer has a relatively small average particle size. When the ratio of the number of moles of aliphatic alcohol:total number of hydrocarbyl groups attached to the metal atom in component (1) is relatively high, the resultant polymer has a relatively large average particle size.

12 Claims, 1 Drawing Figure

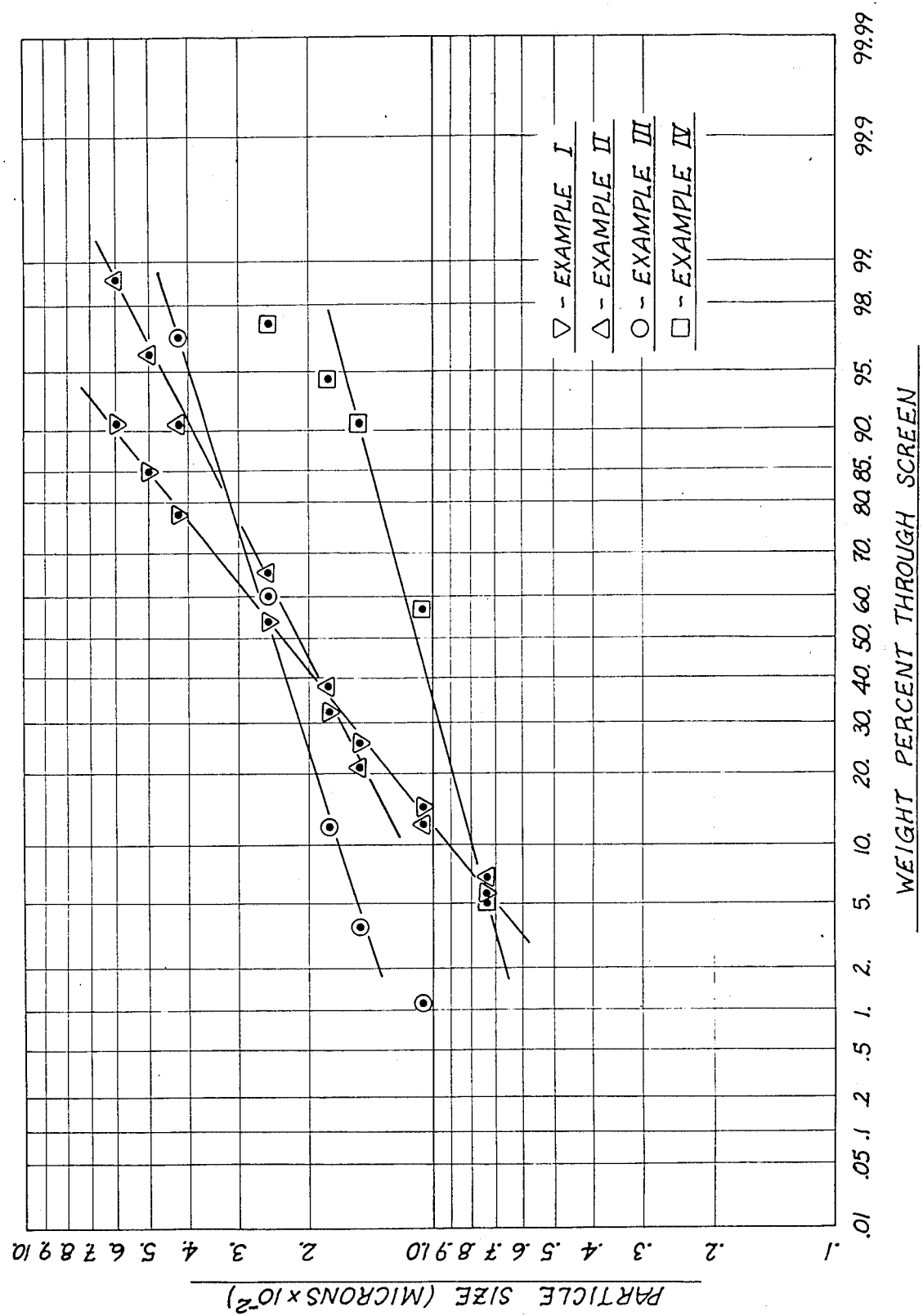

4,661,465

METHOD FOR PREPARING TRANSITION METAL COMPONENT OF ZIEGLER-NATTA CATALYSTS

CROSS REFERENCE TO RELATED APPLICATION

This application is a continuation-in-part of copending application Ser. No. 794,219 filed Oct. 31, 1985 and now abandoned.

BACKGROUND OF THE INVENTION

The present invention pertains to a method for preparing the transition metal component of a Ziegler-Natta Catalyst which method provides a means for varying the average particle size and particle size distribution of α-olefin polymers produced in the presence of said catalysts.

U.S. Pat. No. 4,526,943 issued July 2, 1985 to Fuentes, Jr. et al and U.S. Pat. No. 4,544,647 issued Oot. 1, 1985 to Fuentes, Jr. et al disclose a Ziegler-Natta catalyst useful in the polymerization of one or more α-olefins. While these catalysts are very efficient, no method for controlling the average particle size or particle size distribution was provided. In some instances such as when an α-olefin polymer is to be chemically modified while still in the powder form, it is desirable to have as small an average particle size as possible in order to present a large surface area for modification. Also when chemical modification of the α-olefin polymer is desired, a narrow particle size distribution provides for a more uniformly reacted α-olefin poymer. It is also sometimes desirable to have a small average particle size when efficient removal of the inert polymerization diluent from the α-olefin polymer is required. In some instances in which extrusion processing of the polymer is not performed, it is desirable to have as large an average particle size as possible and a narrow particle size distribution for improved handling of the α-olefin polymer.

The present invention provides a method for preparing the transition metal component of a Ziegler-Natta catalyst which permits the preparation of α-olefin polymers having a relatively large or relatively small average particle size and with a narrow particle size distribution while maintaining a high catalyst efficiency.

SUMMARY OF THE INVENTION

The present invention pertains to an improved method for preparing a transition metal component of a Ziegler-Natta catalyst from (1) a hydrocarbon soluble organomaqnesium component in an inert hydrocarbon diluent, (2) an aliphatic alcohol, (3) a transition metal (Tm) compound and (4) a reducing halide source in an inert hydrocarbon diuent; wherein the components are employed in quantities so as to provide atomic ratios of Mg:Tm of from about 0.1:1 to about 100:1, preferably from about 1:1 to about 40:1, most preferably from about 5:1 to about 20:1; Cl:Mg of from about 3:1 to about 20:1, preferably from about 6:1 to about 20:1, most preferably from about 8:1 to about 12:1 and the aliphatic acohol component 2 is present in a quantity such that for every magnesium and aluminum atom present in component (1) there remains on the average no more than about 0.9 hydrocarbon group attached to a maqnesium atom and an aluminum atom combined; wherein said improvement resides in mixing (A) the product resulting from mixing in an inert hydrocarbon diluent components (1), (2) and (3) with (B), component (4), at conditions such that (a) when it is desirable for a polymer resulting from polymerizing one or more α-olefins in the presence of said transition metal component and a cocatalyst under surry conditions to have a relatively small average particle size, the ratio of the moles of aliphatic alcohol:total number of hydrocarbyl groups attached to a metal atom in component (1) is relatively low;

(b) when it is desirable for a polymer resulting from polymerizing one or more α-olefins in the presence of said transition metal component and a cocatalyst under slurry conditions to have a relatively large average particle size, the ratio of moles of aliphatic alcohol:total number of hydrocarbyl groups attached to a metal atom in component (1) is relatively hiqh; and (c) when it is desirable for a polymer resulting from polymerizing one or more α-olefins in the presence of said trasition metal component and a cocatalyst under slurry conditions to have a relatively narroW particle size distribution, the concentration of magnesium in component (A) and the metal concentration in component (B) are relatively low.

Another aspect of the present invention pertains to an improvement in the polymerization of one or more α-olefins in the presence of a Ziegler-Natta catalyst wherein the transition metal component consists of (1) a hydrocarbon soluble organomagnesium component in an inert hydrocarbon diluent, (2) an aliphatic alcohol, (3) a transition metal (Tm) compound and (4) a reducing halide source in an inert hydrocarbon diluent; wherein the components are employed in quantities so as to provide atomic ratios of Mg:Tm of from about 0.1:1 to about 100:1, preferably from about 1:1 to about 40:1, most preferably from about 5:1 to about 20:1; Cl:Mg of from about 3:1 to about 20:1, preferably from about 6:1 to about 20:1, most preferably from about 8:1 to about 12:1 and the aliphatic alcohol, component (2), is present in a quantity such that for every magnesium and aluminum atom present in component (1) there remains on the average no more than about 0.9 hydrocarbon group attached to a magnesium atom and an aluminum atom combined; wherein said improvement resides in mixing (A), the product resulting from mixing in an inert hydrocarbon diluent components (1), (2) and (3), with (B) component (4) at conditions such that (a) when it is desirable for a polymer resulting from polymerizing one or more α-olefins in the presence of said transition metal component and a cocatalyst under slurry conditions to have a relatively small average particle size, the ratio of the moles of aliphatic alcohol added to the total number of hydrocarbyl groups originally attached to a metal atom in component (1) is relatively low;

(b) when it is desirable for a polymer resultng from one or more α-olefins in the presence of said transition metal component and a cocatalyst under slurry conditions to have a relatively large average particle size, the ratio of the moles of aiphatic alcohol added to the total number of hydrocarbyl groups originally attached to a metal atom in component (1) is relatively high; and (c) when it is desirable for a polymer resulting from one or more α-olefins in the presence of said transition metal component add a cocatalyst under slurry conditions to have a relatively narrow particle size distribution, the concentration of maqnesium in component (A)

and the metal concentration in component (B) are relatively low.

DESCRIPTION OF THE DRAWING

The drawing is a plot of the particle size vs. weight percent passage through screen for the polymers produced in Examples I–IV plotted on a probability x log chart.

DETAILED DESCRIPTION OF THE INVENTION

Usually, if it is desired to prepare homopolyethylene having an average particle size of less than about 110 microns, and a particle size distribution which is relatively narrow, the alcohol, component 2, is present in a quantity such that for every magnesium and aluminum atom present in component (A) there remains on the average no more than about 0.9 hydrocarbon group attached to a magnesium atom and an aluminum atom combined, preferably no more than from about 0.7 to about 0.3, most preferably no more than about 0.5, the concentration of magnesium in component (A) in the hydrocarbon diluent should be less than about 0.2 molar, preferably between about 0.05 and about 0.15 molar, and most preferably about 0.1 molar and the metal concentration of component (B) in the diluent should be less than 1.0 molar, preferably between 0.5 and 0.9 molar, most preferably 0.8 molar.

When it is desired to prepare homopolyethylene with a relatively large average particle size and a relatively broad particle size distribution, the alcohol, component 2 is present in a quantity such that for every magnesium and aluminum atom present in component (A) there remains on the average no more than about 0.3 hydrocarbon group attached to a magnesium atom and an aluminum atom combined, preferably no more than from about 0.2 to about zero, most preferably about zero, the concentration of magnesium in component (A) in the hydrocarbon diluent should be greater than about 0.3 molar, preferably from about 0.4 molar to about 1.0 molar, and most preferably about 0.5 molar and the metal concentration of component (B) in the diluent should be from about 1.0 molar to about 2.0 molar, preferably from about 1.3 to about 1.7 molar, most preferably about 1.5 molar. While the actual initial mixing temperatures and concentrations of components (A) and (B) as well as the ratio of the moles of alcohol:total number of hydrocarbyl groups in component (1) will vary, similar results can be achieved with copolymers of ethylene and one or more α-olefins which may or may not include other polymerizable ethylenically unsaturated monomers such as styrene, acrylates and methacrylates, acrylic acid and methacrylic acid and the like.

The terms "relatively narrow particle size distribution" and "relatively broad particle size distribution" refer to the range of particle sizes adjusted by the average particle size, which is produced by polymerization with a specified catalyst. A convenient and useful way to define the size of this range is to calculate the ratio shown, called the distribution ratio or d-ratio, $$d\text{-ratio} = \frac{\text{size }(85\%) - \text{size }(50\%)}{\text{size }(50\%)}$$

where size(85%) is defined as the particle size at which 85% of the weight of the total polymer in consideration is less than that size and size(50%) is defined as the particle size at which 50% of the total polymer in consideration is less than that size.

A polymer with a relatively narrow particle size distribution can then be defined as one in which the calculated d-ratio is <0.5. A polymer with a relatively broad particle size distribution can be defined as one in which the calculated d-ratio is ≧0.5.

The terms "relatively small average particle size" and "relatively large average particle size" refers to the size of particle at which 50% of the particles as measured by weight are greater and smaller than that size. A polymer with a relatively small average particle size can then be defined as one with an average particle size as measured by weight of <200 microns. A polymer with a relatively large average particle size can then be defined as one with an average particle size as measured by weight of ≧200 microns.

In preparing the transition metal catalysts, it is preferred to add the reducing halide component enumerated supra as (B) and (4) to the product resulting from reacting components (1), (2) and (3), component (A). An alternate method is to add the components in the order of (1), (2), (3) and (4).

The organomagnesium materials which are suitably employed in the present invention include those represented by the formula $R_2Mg \cdot xMeR'_{x'}$ wherein each R is independently a hydrocarbyl group and each R' is independently a hydrogen, hydrocarbyl or hydrocarbyloxy group, Me is Al, Zn or B, x has a value from 0 to 10 and x' has a value equal to the valence of Me.

The term hydrocarbyl as employed herein refers to a monovalent hydrocarbon group such as alkyl, cycloalkyl, aryl, aralkyl, alkenyl and similar hydrocarbon groups having from 1 to about 20 carbon atoms with alkyl having from 1 to 10 carbon atoms being preferred.

The term hydrocarbyloxy as employed herein refers to monovalent oxyhydrocarbon group such as alkoxy, cycloalkoxy, aryloxy, aralkoxy, alkenoxy and similar oxyhydrocarbon groups having from 1 to about 20 carbon atoms with alkoxy groups having from 1 to 10 carbon atoms being the preferred hydrocarbyloxy groups.

The quantity of $MeR'_{x'}$ i.e. the value of x, is preferably the minimum amount which is sufficient to render the magnesium compound soluble in the inert solvent or diluent which is usually a hydrocarbon or mixture of hydrocarbons. The value of x therefore is from zero to about 10, usually from about 0.2 to about 2.

Particularly suitable organomagnesium compounds include, for example, di-(n-butyl) magnesium, n-butyl-sec-butyl magnesium, diisopropyl magnesium, di-n-hexyl magnesium, isopropyl-n-butyl magnesium, ethyl-n-hexyl magnesiu-m, ethyl-n-butyl magnesium, di-(n-octyl) magnesium, butyl octyl magnesium and such complexes as di-n-butyl magnesium.1/3 aluminum triethyl, di-(n-butyl) magnesium.1/6 aluminum triethyl, n-butyl-sec-butyl magnesium.1/2 triisobutylaluminum, butyl ethyl magnesium.1/2 triisobutylaluminum, butyl ethyl magnesium.1/4 triisobutylaluminum, butyl octyl magnesium.1/2 triisobutylaluminum, dihexylmagnesium.1/2 triisobutylaluminum, mixtures thereof and the like.

Suitable aliphatic alcohols which can be employed herein include, for example, those aliphatic or cycloaliphatic alcohols having from 1 to about 10, preferably from 1 to about 6, most preferably from about 2 to about 5 carbon atoms.

Particularly suitable alcohols include, for example, methyl alcohol, ethyl alcohol, n-propyl alcohol, isopropyl alcohol, n-butyl alcohol, sec-butyl alcohol, tert-butyl alcohol, 2-pentanol, n-octyl alcohol, octadecyl alcohol, mixtures thereof and the like.

Suitable reducing halide sources include those represented by the formulas $Al(R^3)_{3-m}X_m$ and $B(R^3)_{3-m}X_m$ including mixtures thereof wherein each $R^3$ is independently hydrogen or a hydrocarbyl group as hereinbefore defined, X is a halogen and m has a value from 1 to 2.

Particularly suitable reducing halides include, for example, ethylaluminum dichloride, diethylaluminum chloride, ethylaluminum sesquichloride, ethylboron dichloride, diethylboron chloride, mixtures thereof and the like.

Suitable transition metal compounds which can be employed include those represented by the formulas $TmY_nX_{z-n}$, and

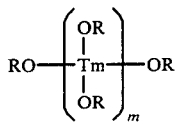

wherein Tm is a transition metal in its highest stable valence state and being selected from groups IV-B, V-B and VI-B of the Periodic Table of the Elements; Y is oxygen, OR'' or $NR_2$''; R is a hydrocarbyl group having from 1 to about 20 carbon atoms, preferably from 1 to about 10; R'' is hydrogen or a hydrocarbyl group having from 1 to about 20 carbon atoms; X is a halogen, preferably chlorine or bromine; z has a value corresponding to the valence of the transition metal, Tm; m has a value from 2 to about 20, preferably from 2 to about 10; n has a value of from zero to 5 with the value of z−n being from zero up to a value equal to the valence state of the transition metal, Tm.

Particularly suitable transition metal compounds include, for example, titanium tetrachloride, titanium tetrabromide, dibutoxy titanium dichloride, monoethoxy titanium trichloride, isopropoxytitanium trichloride, tetraisopropoxytitanium, tetrabutyoxytitanium, tetra(2-ethylhexoxy)titanium, isopropyltitanate decamer, chromyl chloride, vanadium oxytrichloride, zirconium tetrachloride, tetrabutoxyzirconium, vanadium tetrachloride, mixtures thereof and the like.

Suitable organic inert diluents in which the catalyst can be prepared and in which the α-olefin polymerization can be conducted include, for example, liquefied ethane, propane, isobutane, n-butane, isopentane, n-pentane, n-hexane, the various isomeric hexanes, isooctane, paraffinic mixtures of alkanes having from 8 to 12 carbon atoms, cyclohexane, methylcyclopentane, dimethylcyclohexane, dodecane, eicosane industrial solvents composed of saturated or aromatic hydrocarbons such as kerosene, naphthas, etc., especially when freed of any olefin compounds and other impurities, and especialy those having boiling points in the range from about −50° to about 200° C. Also included as suitable inert diluents are benzene, toluene, ethylbenzene, cumene, decalin and the like.

Suitable cocatalysts or activators with which the catalysts of the present invention can be reacted, contacted or employed in the polymerization of α-olefins includes those aluminum, boron, zinc or magnesium compounds represented by the formulas $Al(R^3)_{3-a}X'_a$, $B(R^3)_{3-a}X'_a$, $MgR^3_2$, $MgR^3X'$, $ZnR^3_2$ or mixtures thereof wherein $R^3$ is as previously defined; X' is a halogen, preferably chlorine or bromine; and a has a value of from zero to 2, preferably zero to 1 and most preferably zero.

Particularly suitable cocatalysts or activators include, for example, diethylaluminum chloride, ethylaluminum dichloride, diethylaluminum bromide, triethylaluminum, triisobutylaluminum, diethylzinc, dibutylmagnesium, butylethylmagnesium, butylmagnesium chloride, diisobutylaluminum hydride, isoprenylaluminum, triethylboron, trimethylaluminum, mixtures thereof and the like.

The cocatalysts or activators are employed in quantities such that the atomic ratio of the Al, B, Mg, Zn or mixtures thereof to Tm is from about 0.1:1 to about 1000:1, preferably from about 5:1 to about 500:1 and most preferably from about 10:1 to about 200:1.

The catalyst and cocatalyst or activator may be added separately to the polymerization reactor or they may be mixed together prior to addition to the polymerization reactor.

Olefins which are suitably homopolymerized or copolymerized in the practice of this invention are generally any one or more of the aliphatic α-olefins such as, for example, ethylene, propylene, butene-1, pentene-1, 3-methylbutene-1, 4-methylpentene-1, hexene-1, octene-1, dodecene-1, octadecene-1, 1,7-octadiene and the like. It is understood that α-olefins may be copolymerized with one or more other α-olefins and/or with small amounts i.e., up to about 25 weight percent based on the polymer of other polymerizable ethylenically unsaturated monomers such as styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene and up to 50 weight percent, especially from about 0.1 to about 40 weight percent of propylene, butene-1, hexene-1, octene-1, 4-methylpentene-1, 1,7-octadiene or similar α-olefin or α-diolefin based on total monomer.

In the polymerization process employing the aforementioned catalytic reaction product, polymerization is effected by adding a catalytic amount of the catalyst composition to a polymerization zone containing α-olefin monomer, or vice versa. The polymerization zone is maintained at temperatures in the range from about 0° to about 120° C., preferably at slurry polymerization temperatures, e.g., from about 0° to about 95° C., more preferably from about 50° to about 90° C., for a residence time of from about 15 minutes to about 24 hours, preferably from about 30 minutes to about 8 hours. It is generally desirable to carry out the polymerization in the absence of moisture and oxygen and a catalytic amount of the catalytic reaction product is generally within the range from about 0.0001 to about 0.1 milligram-atoms transition metal per liter of diluent. It is understood, however, that the most advantageous catalyst concentration will depend upon polymerization conditions such as temperature, pressure, diluent and presence of catalyst poisons and that the foregoing range is given to obtain maximum catalyst yields. Generally in the polymerization process, a carrier which may be an inert organic diluent or excess monomer is generally employed. In order to realize the full benefit of the high efficiency catalyst of the present invention care must be taken to avoid oversaturation of the diluent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitable as defined hereinbefore.

The polymerization pressures preferably employed are relatively low, e.g., from about 10 to about 500 psig. However, polymerization within the scope of the present invention can occur at pressures from atmospheric up to pressures determined by the capabilities of the polymerization equipment. During polymerization it is desirable to agitate the polymerization recipe to obtain better temperature control and to maintain uniform polymerization mixtures throughout the polymerization zone.

Hydrogen is often employed in the practice of this invention to control the molecular weight of the resultant polymer. For the purpose of this invention, it is beneficial to employ hydrogen in concentrations ranging from about 0 to about 80 volume percent in the gas or liquid phase in the polymerization vessel. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst. Using the general method described, the polymerization reactor may be operated liquid full or with a gas phase and at solution or slurry polymerization conditions.

The monomer or mixture of monomers is contacted with the catalytic reaction product in any conventional manner, preferably by bringing the catalyst composition and monomer together with intimate agitation provided by suitable stirring or other means. Agitation can be continued during polymerization. In the case of more rapid reactions with more active catalysts, means can be provided for refluxing monomer and solvent, if any of the latter is present and thus remove the heat of reaction. In any event, adequate means should be provided for dissipating the exothermic heat of polymerization, e.g., by cooling reactor walls, etc. If desired, the monomer can be brought in the vapor phase into contact with the catalytic reaction product, in the presence or absence of liquid material. The polymerization can be effected in a batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent. The resultant polymer is found to contain insignificant amounts of catalyst residue.

The following examples are given to illustrate the invention, and should not be construed as limiting its scope. All parts and percentages are by weight unless otherwise indicated.

In the following examples, the flow rates for the melt index value, $I_2$, and for the value $I_{10}$, were determined by ASTM D 1238 conditions E and N, respectively. The flow rate ratio, FRR, or $I_{10}/I_2$, is a dimensionless number derived by dividing the flow rate at Condition E by the flow rate at Condition N and is discussed in section 7.3 of ASTM D 1238. The apparent bulk density is determined as an unsettled bulk density according to the procedure of ASTM 1895 employing a paint volumeter from Sargent-Welch Scientific Company (catalog no. S-64985) as the cylinder instead of the one specified by the ASTM procedure. Polymer particle size was determined by sieving the powder through two sets of U.S.A. Standard Testing Sieves meeting ASTM E-11 criteria. To approximately 100 grams of polymer was added 0.1 gram of finely divided carbon black and the mixture was then sieved through number 20, 30, 35, 40 and 60 sieves corresponding to 850, 600, 500, 425 and 250 micron openings, respectively. The weight of the material remaining on the sieves was then measured by difference and the material that passed through the number 60 sieve was further sieved through number 80, 100, 140 and 200 sieves, which correspond to 180, 150, 106 and 75 micron openings, respectively. The percentage of material through each screen was then calculated and plotted on logarithmic- probability paper with the sieve size on the y-axis. The average size of the powder as measured by weight was determined by the intersection of the best fit curve to the data with the 50% probability line. The relative width of the particle size distribution was also determined from the plot by taking the size at the 85% probability line, subtracting the average size as determined above, and dividing the difference by the average size. The resulting number gives an indication of the relative narrowness of the particle size distribution. A small ratio is indicative of a narrow particle size distribution. A standard reference for particle size measurement and interpretation is Particle Size: Measurement, Interpretation and Application by Riyad R. Irani and Clayton F. Callis, John Wiley & Sons, Inc., New York, 1963.

GENERAL PROCEDURE

In each of the following examples, unless otherwise stated, the catalyst components were blended under a dry, oxygen free atmosphere using a constant rate of agitation in the vessel. The butylethylmagnesium, triisobutylaluminum and ethylaluminumdichloride were obtained as hydrocarbon solutions from Texas Alkyls, Inc. All ratios are molar ratios unless otherwise indicated.

CATALYST PREPARATION

For Examples I-IV, the method of catalyst preparation is outlined below and the values of the preparation variables are indicated in Table I as quantities (a) through (f).

To a solution which was (a) molar (see Table I) in butylethylmagnesium and (b) molar (see Table I) in triisobutylaluminum was added n-propylalcohol until the ratio of moles of alcohol, component 2 added, to the total number of hydrocarbyl groups originally on the organomagnesium and triisobutylaluminum was (c) (see Table I). The temperature of the solution was then maintained at (d) degrees C (see Table I). A 50% by volume solution of tetraisopropyltitanate in hexane was then added to make the ratio of Mg:Ti in the solution 10:1. A solution of (e) molar (see Table I) ethylaluminumdichloride in hydrocarbon at a temperature of (f) degrees C (see Table 1) was then added until the ratio of Cl:Mg was 10:1 in the solution. The catalyst slurry solution was then aged for at least 8 hours with stirring prior to being used for polymerization.

TABLE I

| EX-AMPLE | (a) molarity | (b) molarity | (c)[1] ROH/R | (d) °C. | (e) molarity | (f) °C. |
|---|---|---|---|---|---|---|
| I | 0.59 | 0.29 | 1.0 | 35 | 1.5 | 25–40 |
| II | 0.28 | 0.14 | 1.0 | 35 | 1.5 | 36–48 |
| III | 0.104 | 0.052 | 1.0 | 35 | 0.8 | 36–50 |
| IV | 0.104 | 0.052 | 0.8 | 35 | 0.8 | 38–50 |

[1] A ROH/R ratio of 1.0 means that after the addition of component 2, there remained on the average essentially no hydrocarbon groups attached to a magnesium atom and an aluminum atom combined. A ROH/R ratio of 0.8 means that after the addition of component 2, there remained on the average about 0.5 hydrocarbon group attached to a magnesium atom and an aluminum atom combined.

POLYMERIZATIONS

All polymerizations were conducted in a 2.5 liter stainless steel reactor by taking an aliquot of the catalyst prepared as described above containing 0.004 millimole titanium and adding the aliquot to 1.6 liters of dry oxygen free hexane containing sufficient triisobutylaluminum to make the ratio of Al:Ti equal to 200:1. The reactor nitrogen atmosphere was replaced with hydrogen by purging, the reactor contents were heated to 85° C., and the reactor pressure adjusted with hydrogen to obtain the pressure indicated in Table II for each of the examples. Ethylene was then added to maintain a reactor pressure of 170 psig (1172.1 kPa). After two hours (7200 s) at 85° C., the reactor was cooled, the ethylene-hydrogen mixture vented, and the reactor contents filtered. The polyethylene was dried in a vacuum oven overnight at 60° C. The yield, $I_2$, $I_{10}/I_2$, bulk density, catalyst efficiency, weight average particle size and particle size distribution as defined previously as the d-ratio were then measured and calculated for each of the examples. The percentage of material not retained on the various sieves used is plotted in the Figure for each of the examples. The 50 and 85% probability lines are indicated in the Figure as well. Table II gives the data and calculated results for each of the examples.

TABLE II

| EX. | Pressure Before Ethylene Addition, psig, (kPa) | Yield (grams) | Catalyst Efficiency (Grams PE/Grams Ti) | $I_2$ | $I_{10}/I_2$ | Bulk Density lbs/ft³, (g/cc) | Average Particle Size By Weight (microns) | 85% – 50% / 50% |
|---|---|---|---|---|---|---|---|---|
| I | 70 (483) | 427.0 | 1,480,000 | 1.45 | 11.5 | 17.1 (0.27) | 240 | 1.17 |
| II | 70 (483) | 356.0 | 1,240,000 | 1.52 | 10.8 | 20.6 (0.33) | 212 | 0.65 |
| III | 50 (345) | 266.0 | 1,190,000 | 0.06 | 10.2 | 21.6 (0.35) | 246 | 0.35 |
| IV | 50 (345) | 341.0 | 1,780,000 | 0.10 | 10.0 | 22.2 (0.36) | 108 | 0.26 |

| SCREEN SIZE IN MICRONS | 850 | 600 | 500 | 425 | 250 | 180 | 150 | 106 | 75 | 0 |
|---|---|---|---|---|---|---|---|---|---|---|
| EXAMPLE I | | | | | | | | | | |
| % RETAINED | 2.8 | 6.6 | 6.4 | 7.2 | 23.6 | 21.4 | 6.7 | 10.3 | 9.7 | 5.3 |
| % THRU | 97.2 | 90.6 | 84.2 | 77.0 | 53.4 | 32.0 | 25.3 | 15.0 | 5.3 | 0.0 |
| EXAMPLE II | | | | | | | | | | |
| % RETAINED | 0.4 | 0.9 | 2.7 | 5.4 | 25.1 | 28.3 | 15.9 | 9.0 | 6.0 | 6.4 |
| % THRU | 99.6 | 98.7 | 96.0 | 90.6 | 65.5 | 37.2 | 21.3 | 12.3 | 6.4 | 0.0 |
| EXAMPLE III | | | | | | | | | | |
| % RETAINED | 0.0 | 0.3 | 0.9 | 1.8 | 36.9 | 49.2 | 8.3 | 1.5 | 0.3 | 0.8 |
| % THRU | 100.0 | 99.7 | 98.8 | 96.9 | 60.1 | 10.9 | 2.6 | 1.1 | 0.8 | 0.0 |
| EXAMPLE IV | | | | | | | | | | |
| % RETAINED | 0.8 | 0.3 | 0.2 | 0.2 | 1.5 | 2.5 | 3.8 | 34.6 | 51.1 | 5.1 |
| % THRU | 99.2 | 98.9 | 98.8 | 98.6 | 97.1 | 94.6 | 90.8 | 56.1 | 5.1 | 0.0 |

We claim:

1. In a method for preparing a transition metal component of a Ziegler-Natta catalyst from (1) a hydrocarbon soluble organomagnesium component in an inert hydrocarbon diluent, (2) an aliphatic alcohol, (3) a transition metal (Tm) compound and (4) a reducing halide source in an inert hydrocarbon diluent; wherein the components are employed in quantities so as to provide atomic ratios of Mg:Tm of from about 0.1:1 to about 100:1; Cl:Mg of from about 3:1 to about 20:1; and the aliphatic alcohol component (2) is present in a quantity such that for every magnesium and aluminum atom present in component (1) there remains on the average no more than about 0.9 hydrocarbon groups attached to a magnesium atom and an aluminum atom combined; the improvement which comprises mixing (A), the product resulting from mixing in an inert hydrocarbon diluent components (1), (2) and (3), with (B), component (4), at conditions such that (a) when it is desirable for a polymer resulting from polymerizing one or more α-olefins in the presence of said transition metal component and a cocatalyst under slurry conditions to have a relatively small average particle size, the ratio of the moles of aliphatic alcohol added to the total number of hydrocarbyl groups originally attached to a metal atom in component (1) is relatively low;

(b) when it is desirable for a polymer resulting from polymerizing one or more α-olefins in the presence of said transition metal component and a cocatalyst under slurry conditions to have a relatively large average particle size, the ratio of the moles of aliphatic alcohol added to the total number of hydrocarbyl groups originaly attached to a metal atom in component (1) is relatively high; and (c) when it is desirable for a polymer resulting from polymerizing one or more α-olefins in the presence of said transition metal component and a cocatalyst under slurry conditions to have a relatively narrow particle size distribution, the concentration of magnesium in component (A) and the metal concentration in component (B) are relatively low.

2. A method of Claim 1 wherein
(i) the atomic ratio of Mg:Tm is from about 1:1 to about 40:1;
(ii) the atomic ratio of Cl:Mg is from about 6:1 to about 20:1;
(iii) the aliphatic alcohol, component (2), is present in a quantity such that for every metal atom present in component (1) there remains on the average no more than about 0.7 hydrocarbon groups attached to a metal atom(s);
(iv) the concentration of magnesium in component (A) is from about 0.05 to about 1 molar prior to mixing with component B and the metal concentration of component (B) prior to addition to component (A) is from about 0.5 to about 2 molar.

3. A method of claim 2 wherein (i) the atomic ratio of Mg:Tm is from about 5:1 to about 20:1; and
(ii) the atomic ratio of Cl:Mg is from about 8:1 to about 12:1.

4. A method of claim 1 wherein
(i) said hydrocarbon soluble magnesium component is represented by the formula $R_2Mg \cdot xMeR'_{x'}$, wherein each R is independently a hydrocarbyl group having from 1 to about 20 carbon atoms; each R' is independently hydrogen or a hydrocarbyl or hydrocarbyloxy group having from 1 to about 20 carbon atoms; Me is Al, Zn or B; x has a value sufficient to render the magnesium compound hydrocarbon soluble and x' has a value equal to the valence of Me;
(ii) said transition metal compound is represented by the formula $TmY_nX_{z-n}$ wherein Tm is a transition metal in its highest stable valence state and being selected from groups IV-B, V-B and VI-B of the Periodic Table of Elements; Y is oxygen, OR" or $NR_2''$; R" is hydrogen or a hydrocarbyl group having from 1 to about 20 carbon atoms; X is a halogen; z has a value corresponding to the valence of the metal Tm; n has a value of from zero to 5 with the value of z−n being from zero up to a value equal to the valence state of the transition metal, Tm;
(iii) said aliphatic alcohol has from about 1 to about 10 carbon atoms; and
(iv) said reducing halide source is represented by the formulas $Al(R^3)_{3-m}X_m$ or $B(R^3)_{3-m}X_m$ wherein each $R^3$ is independently hydrogen or a hydrocarbyl group having from 1 to about 20 carbon atoms, X is a halogen and m has a value from 1 to 2.

5. A method of claim 2 wherein
(i) said hydrocarbon soluble magnesium component is represented by the formula $R_2Mg \cdot xMeR'_x$, wherein each R is independently a hydrocarbyl group having from 1 to about 20 carbon atoms; each R' is independently hydrogen or a hydrocarbyl or hydrocarbyloxy group having from 1 to about 20 carbon atoms; Me is Al, Zn or B; x has a value sufficient to render the magnesium compound hydrocarbon soluble and x' has a value equal to the valence of Me;
(ii) said transition metal compound is represented by the formula $TmY_nX_{z-n}$ wherein Tm is a transition metal in its highest stable valence state and being selected from groups IV-B, V-B and VI-B of the Periodic Table of Elements; Y is oxygen, OR" or $NR_2''$; R" is hydrogen or carbyl group having from 1 to about 20 carbon atoms; X is a halogen; z has a value corresponding to the valence of the metal Tm; n has a value of from zero to 5 with the value of z−n being from zero up to a value equal to the valence state of the transition metal, Tm;
(iii) said aliphatic alcohol has from about 1 to about 10 carbon atoms; and
(iv) said reducing halide source is represented by the formulas $Al(R^3)_{3-m}X_m$ or $B(R^3)_{3-m}X_m$ wherein each $R^3$ is independently hydrogen or a hydrocarby group having from 1 to about 20 carbon atoms, X is a halogen and m has a value from 1 to 2.

6. A method of claim 3 wherein
(i) said hydrocarbon soluble magnesium component is represented by the formula $R_2Mg \cdot xMeR'_x$, wherein each R is independently a hydrocarbyl group having from 1 to about 20 carbon atoms; each R' is independently hydrogen or a hydrocarbyl or hydrocarbyloxy group having from 1 to about 20 carbon atoms; Me is Al, Zn or B; x has a value sufficient to render the maqnesium compound hydrocarbon soluble and x' has a value equal to the valence of Me;
(ii) said transition metal compound is represented by the formula $TmY_nX_{z-n}$ wherein Tm is a transition metal in its highest stable valence state and being selected from groups IV-B, V-B and VI-B of the Periodic Table of Elements; Y is oxygen, OR" or $NR_2''$; R" is hydrogen or a hydrocarbyl group having from 1 to about 20 carbon atoms; X is a halogen; z has a value corresponding to the valence of the metal Tm; n has a value of from zero to 5 with the value of z−n being from zero up to a value equal to the valence state of the transition metal, Tm;
(iii) said aliphatic alcohol has from about 1 to about 10 carbon atoms; and
(iv) said reducing halide source is represented by the formulas $Al(R^3)_{3-m}X_m$ or $B(R^3)_{3-m}X_m$ wherein each $R^3$ is independently hydrogen or a hydrocarbyl group having from 1 to about 20 carbon atoms, X is a halogen and m has a value from 1 to 2.

7. A method of claim 4 wherein
(i) Me is Al;
(ii) Tm is Ti; and
(iii) said reducing halide source is represented by the formula $Al(R^3)_{3-m}X_m$.

8. A method of claim 7 wherein
(i) said magnesium component is butylethylmagnesium. 1/2 triisobutylaluminum, dibutylmagnesium.1/2 triisobutylaluminum, dihexylmagnesium.1/2 triisobutylaluminum, butyloctylmagnesium.1/2 triisobutylaluminum or combination thereof;
(ii) said aliphatic alcohol is n-propyl alcohol, 2-pentanol, n-octyl alcohol or a combination thereof;
(iii) said transition metal component is tetraisopropoxytitanium, titanium tetrachloride, tetra-n-butoxytitanium, tetra(2-ethylhexoxy)titanium or a combination thereof; and
(iv) said reducing halide source is ethylaluminum dichloride, ethylaluminum sesquichloride, diethylaluminum chloride or a combination thereof.

9. A method of claim 5 wherein
(i) Me is Al;

(ii) Tm is Ti; and
(iii) said reducing halide source is represented by the formula $Al(R^3)_{3-m}X_m$.

10. A method of claim 9 wherein
  (i) said magnesium component is butylethylmagnesium. 1/2 triisobutylaluminum, dibutylmagnesium. 1/2 triisobutylaluminum, dihexylmagnesium. 1/2 triisobutylaluminum, butyloctylmagnesium. 1/2 triisobutylaluminum or combination thereof;
  (ii) said aliphatic alcohol is n-propyl alcohol, 2-pentanol, n-octyl alcohol or a combination thereof;
  (iii) said transition metal component is tetraisopropoxytitanium, titanium teyraohloride, tetra-n-butoxytitanium, tetra(2-ethylhexoxy)titanium or a combination thereof; and
  (iv) said reducing halide souuce is ethylaluminum dichloride, ethylaluminum sesquichloride, diethylaluminum chloride or a combination thereof.

11. A method of claim 6 wherein
  (i) Me is Al;
  (ii) Tm is Ti; and
  (iii) said reducing halide source is represented by the formula $Al(R^3)_{3-m}X_m$.

12. A method of claim 11 wherein
  (i) said magnesium component is butylethylmagnesium. 1/2 triisobutylaluminum, dibutylmagnesium.1/2 triisobutylaluminum, dihexylmagnesium.1/2 triisobutylaluminum, butyloctylma-gnesium.1/2 triisobutyaluminum or combination thereof;
  (ii) said aliphatic alcohol is n-propyl alcohol, 2-pentanol, n-octyl alcohol or a combination thereof;
  (iii) said transition metal component is tetraisopropoxytitanium, titanium tetrachloride, tetra-n-butoxytitanium, tetra(2-ethylhexoxy)titanium or a combination thereof; and
  (iv) said reducing halide source is ethylaluminum dichloride, ethylaluminum sesquichloride, diethylaluminum chloride or a combination thereof.

* * * * *